United States Patent
Song et al.

(10) Patent No.: US 7,623,340 B1
(45) Date of Patent: Nov. 24, 2009

(54) NANO-SCALED GRAPHENE PLATE NANOCOMPOSITES FOR SUPERCAPACITOR ELECTRODES

(75) Inventors: Lulu Song, Centerville, OH (US); Aruna Zhamu, Centerville, OH (US); Jiusheng Guo, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 310 days.

(21) Appl. No.: 11/499,861

(22) Filed: Aug. 7, 2006

(51) Int. Cl.
*H01G 9/00* (2006.01)

(52) U.S. Cl. ........ 361/502; 361/503

(58) Field of Classification Search .......... 361/502–503
See application file for complete search history.

(56) References Cited

U.S. PATENT DOCUMENTS

| | | | |
|---|---|---|---|
| 4,987,175 A | 1/1991 | Bunnell, Sr. | |
| 5,186,919 A | 2/1993 | Bunnell, Sr. | |
| 5,786,555 A * | 7/1998 | Saito et al. | 204/294 |
| 6,031,711 A | 2/2000 | Tennent et al. | |
| 7,071,258 B1 | 7/2006 | Jang et al. | |
| 2003/0030963 A1* | 2/2003 | Tennent et al. | 361/305 |
| 2004/0033187 A1* | 2/2004 | Peltola et al. | 423/338 |
| 2004/0262584 A1* | 12/2004 | Bonnet et al. | 252/511 |

OTHER PUBLICATIONS

U.S. Appl. No. 10/858,814, filed Jun. 3, 2004, Jang, et al.
U.S. Appl. No. 11/257,508, filed Oct. 26, 2005, J. Guo, et al.
U.S. Appl. No. 11/328,880, filed Jan. 11, 2006, L. Song, et al.
U.S. Appl. No. 10/659,577, filed Sep. 10, 2003, L. T. Drzal, et al.
K. H. An, et al., "Electrochemical Properties of High-Power Supercapacitors Using Single-Walled CNT Electrodes," Advanced Functional Materials, 11 (No. 5) (Oct. 2001) 387-392.
G. Z. Chen, "Carbon Nanotube and Polypyrrole Composites: Coating and Doping," Advanced Materials, 12 (No. 7) (2000) 522-526.
C. Zhou, et al., "Functionalized Single Wall CNTs Treated with Pyrrole for Electrochemical Supercapacitor Membranes," Chemistry of Materials, 17 (2005) 1997-2002.
K. Jurewicz, et al., "Supercapacitors from Nanotubes/Polypyrrole Composites," Chemical Physics Letters, 347 (Oct. 2001) 36-40.
J. E. Huang, et al., "Well-dispersed Single-walled CNT/Polyaniline Composite Films," Carbon, 41 (2003) 2731-2736.

(Continued)

*Primary Examiner*—Eric Thomas

(57) ABSTRACT

A preferred embodiment of the present invention is a meso-porous nanocomposite material comprising: (A) nano-scaled graphene platelets, wherein each of the platelets comprises a sheet of graphite plane or multiple sheets of graphite plane, and the platelets have a thickness no greater than 100 nm (preferably smaller than 10 nm) and an average length, width, or diameter no greater than 10 μm (preferably smaller than 500 nm); and (B) an electrically conducting binder or matrix material attached or bonded to the platelets to form the nanocomposite material having liquid accessible pores, which provide a surface area greater than about 100 $m^2/gm$, preferably greater than 500 $m^2/gm$, and most preferably greater than 1000 $m^2/gm$. Also disclosed is a capacitor that includes at least an electrode comprising such a meso-porous nanocomposite material. A supercapacitor featuring such a nanocomposite exhibits an exceptionally high capacitance value.

24 Claims, 8 Drawing Sheets

OTHER PUBLICATIONS

M. Xiao, L. Y. Sun, J. J. Liu, Y. Li, and K. C. Gong, "Synthesis and Properties of Polystyrene/Graphite Nanocomposite," Polymer, 43-8 (2002) 2245.

G. H. Chen, C. Wu, W. Weng, D. Wu, and W. Yan, "Preparation of Polystyrene/Graphite Nano-sheet Composite," Polymer, 44 (2003) 1781-1784.

W. Zheng, S. C. Wong, and H. J. Sue, "Transport behavior of PMMA/expanded graphite nanocomposites," Polymer, 73 (2002) 6767.

W. Zheng and S. C. Wong, "Electrical conductivity and dielectric properties of PMMA/expanded graphite composites," Composite Sci., and Tech., 63 (2003) 225.

* cited by examiner

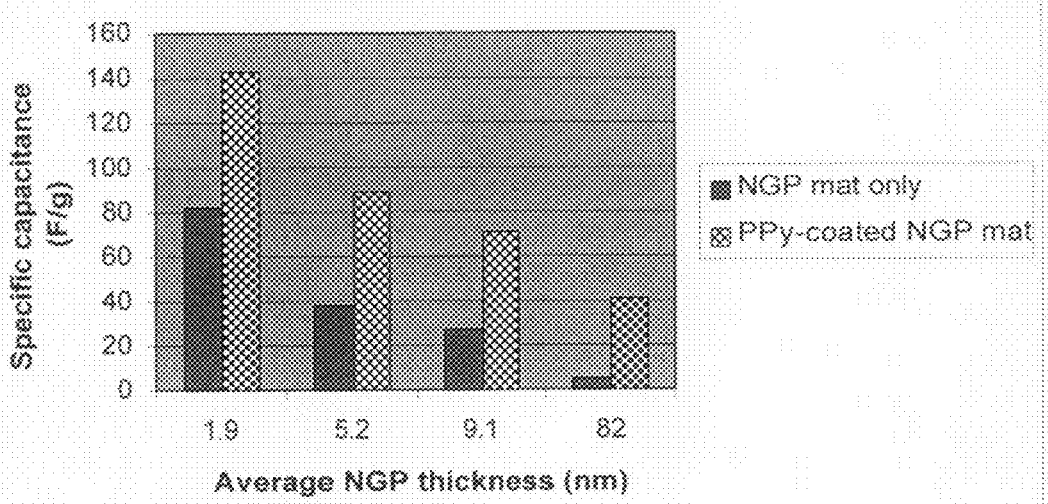
FIG.6 Specific capacitance of NGP mat and PPy-coated NGP mat-based nanocomposite supercapacitors.

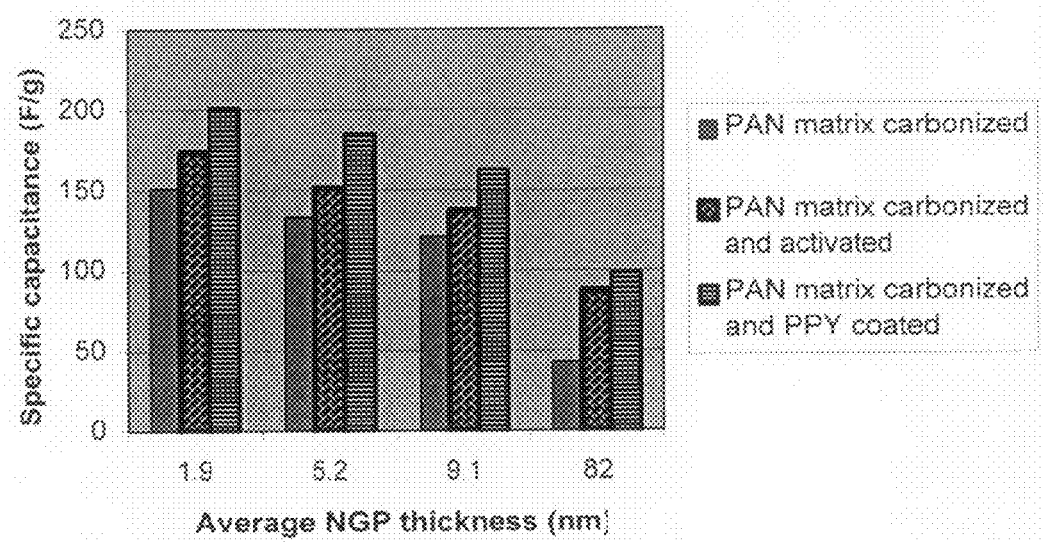

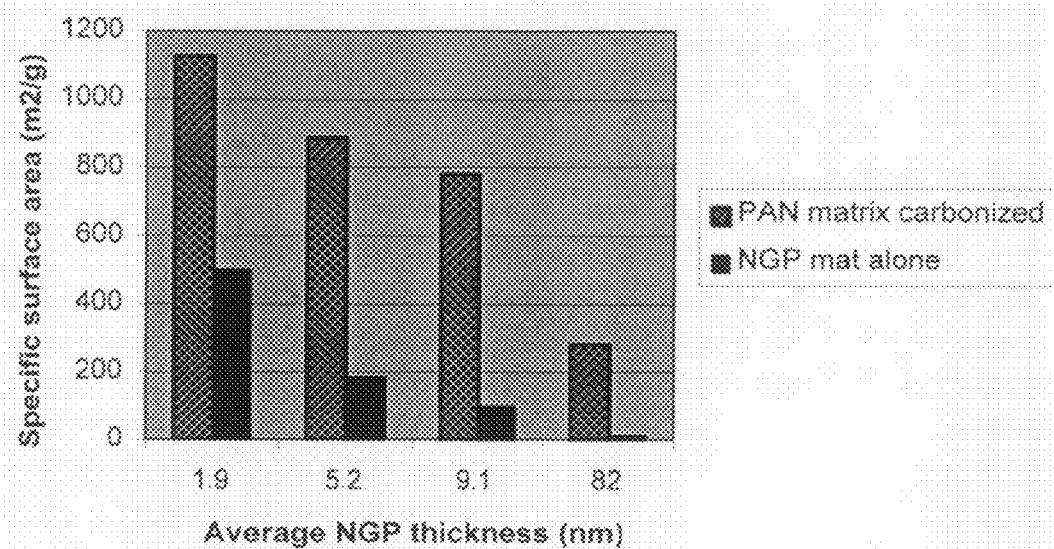

NANO-SCALED GRAPHENE PLATE NANOCOMPOSITES FOR SUPERCAPACITOR ELECTRODES

This invention is based on the results of a research project sponsored by the US DOE SBIR Program. The US government has certain rights on this invention.

FIELD OF THE INVENTION

The present invention relates generally to the field of supercapacitor or ultracapacitor electrode materials based on nanocomposites, and more particularly, to nano-graphene plate-based composite materials (NGP nanocomposites) and supercapacitor electrodes made of these nanocomposites.

BACKGROUND OF THE INVENTION

Electrochemical capacitors (ECs), also known as ultracapacitors or supercapacitors, are being considered for uses in hybrid electric vehicles (EVs) where they can supplement a battery used in an electric car to provide bursts of power needed for rapid acceleration, the biggest technical hurdle to making battery-powered cars commercially viable. A battery would still be used for cruising, but capacitors (with their ability to release energy much more quickly than batteries) would kick in whenever the car needs to accelerate for merging, passing, emergency maneuvers, and hill climbing. The EC must also store sufficient energy to provide an acceptable driving range. To be cost- and weight-effective compared to additional battery capacity they must combine adequate specific energy and specific power with long cycle life, and meet cost targets as well. Specifically, they must store about 400 Wh of energy, be able to deliver about 40 kW of power for about 10 seconds, and provide high cycle-life (>100,000 cycles).

ECs are also gaining acceptance in the electronics industry as system designers become familiar with their attributes and benefits. ECs were originally developed to provide large bursts of driving energy for orbital lasers. In complementary metal oxide semiconductor (CMOS) memory backup applications, for instance, a one-Farad EC having a volume of only one-half cubic inch can replace nickel-cadmium or lithium batteries and provide backup power for months. For a given applied voltage, the stored energy in an EC associated with a given charge is half that storable in a corresponding battery system for passage of the same charge. Nevertheless, ECs are extremely attractive power sources. Compared with batteries, they require no maintenance, offer much higher cycle-life, require a very simple charging circuit, experience no "memory effect," and are generally much safer. Physical rather than chemical energy storage is the key reason for their safe operation and extraordinarily high cycle-life. Perhaps most importantly, capacitors offer higher power density than batteries.

The high volumetric capacitance density of an EC (10 to 100 times greater than conventional capacitors) derives from using porous electrodes to create a large effective "plate area" and from storing energy in the diffuse double layer. This double layer, created naturally at a solid-electrolyte interface when voltage is imposed, has a thickness of only about 1 nm, thus forming an extremely small effective "plate separation." In some ECs, stored energy is further augmented by pseudo-capacitance effects, occurring again at the solid-electrolyte interface due to electrochemical phenomena, such as the redox charge transfer. The double layer capacitor is based on a high surface area electrode material, such as activated carbon, immersed in an electrolyte. A polarized double layer is formed at electrode-electrolyte interfaces providing high capacitance.

Experience with ECs based on activated carbon electrodes shows that the experimentally measured capacitance is always much lower than the geometrical capacitance calculated from the measured surface area and the width of the dipole layer. For very high surface area carbons, typically only about ten percent of the "theoretical" capacitance was observed. This disappointing performance is related to the presence of micro-pores and ascribed to inaccessibility of some pores by the electrolyte, wetting deficiencies, and/or the inability of a double layer to form successfully in pores in which the oppositely charged surfaces are less than about 2 nm apart. In activated carbons, depending on the source of the carbon and the heat treatment temperature, a surprising amount of surface can be in the form of such micro-pores.

It would be desirable to produce an EC that exhibits greater geometrical capacitance using a carbon based electrode having a high accessible surface area, high porosity, and reduced or no micro-pores. It would be further advantageous to develop carbon-based nano-structures that are conducive to the occurrence of pseudo-capacitance effects such as the redox charge transfer.

Carbon nanotubes (CNT) are nanometer-scale sized tube-shaped molecules having the structure of a graphite molecule rolled into a rube. A nanotube can be single-walled or multi-walled, dependent upon conditions of preparation. Carbon nanotubes typically are electrically conductive and mechanically strong and stiff along their length. Nanotubes typically also have a relatively high aspect ratio (length/diameter ratio). Due to these properties, the use of CNTs as reinforcements in composite materials for both structural and functional applications would be advantageous. In particular, CNTs are being studied for electrochemical supercapacitor electrodes due to their unique properties and structure, which include high surface area, high conductivity, and chemical stability. Capacitance values from 20 to 180 F/g have been reported, depending on CNT purity and electrolyte, as well as on specimen treatment such as $CO_2$ physical activation, KOH chemical activation, or exposure to nitric acid, fluorine, or ammonia plasma. Conducting polymers, such as polyacetylene, polypyrrole, polyaniline, polythiophene, and their derivatives, are also common electrode materials for supercapacitors. The modification of CNTs with conducting polymers is one way to increase the capacitance of the composite resulting from redox contribution of the conducting polymers. In the CNT/conducting polymer composite, CNTs are electron acceptors while the conducting polymer serves as an electron donor. A charge transfer complex is formed between CNTs in their ground state and aniline monomer. A number of studies on CNT/conducting polymer composites for electrochemical capacitor applications have been reported. The following references are related to this subject:

1. K. H. An, et al., "Electrochemical Properties of High-Power Supercapacitors Using Single-Walled CNT Electrodes," Advanced Functional Materials, 11 (No. 5) (October 2001) 387-392.
2. G. Z. Chen, "Carbon Nanotube and Polypyrrole Composites: Coating and Doping," Advanced Materials, 12 (No. 7) (2000) 522-526.
3. C. Zhou, et al., "Functionalized Single Wall CNTs Treated with Pyrrole for Electrochemical Supercapacitor Membranes," Chemistry of Materials, 17 (2005) 1997-2002.
4. K. Jurewicz, et al., "Supercapacitors from Nanotubes/Polypyrrole Composites," Chemical Physics Letters, 347 (October 2001) 36-40.

5. J. E. Huang, et al., "Well-dispersed Single-walled CNT/ Polyaniline Composite Films," Carbon, 41 (2003) 2731-2736.
6. H. Tennent, et al., "Graphitic Nano-fibers in Electrochemical Capacitors," U.S. Pat. No. 6,031,711 (Feb. 29, 2000).

However, there are several drawbacks associated with carbon nanotube-filled composites. First, CNTs are known to be extremely expensive due to the low yield and low production and purification rates commonly associated with the current CNT preparation processes. The high material costs have significantly hindered the widespread application of CNTs. Second, it is well-known in the field of composites that the reinforcement fiber orientation plays an important role in governing the mechanical and other physical properties of a composite material. Unfortunately, CNTs tend to form a tangled mess resembling a hairball, which is difficult to work with. This tendency and other difficulties have limited efforts toward realizing a composite material containing well-dispersed CNTs with desired orientations.

Instead of trying to develop much lower-cost processes for making CNTs, researchers (Jang, et al.) at Nanotek Instruments, Inc., have worked diligently to develop alternative nano-scaled carbon materials that exhibit comparable properties, but are more readily available and at much lower costs. This development work has led to the discovery of processes for producing individual nano-scaled graphite planes (individual graphene sheets) and stacks of multiple nano-scaled graphene sheets, which are collectively called nano-sized graphene plates (NGPs). NGPs could provide unique opportunities for solid state scientists to study the structures and properties of nano carbon materials. The structures of these materials may be best visualized by making a longitudinal scission on the single-wall or multi-wall of a nano-tube along its tube axis direction and then flattening up the resulting sheet or plate. FIG. 1 shows an atomic force microscopic picture of a sample of NGPs. In practice, NGPs are obtained from a precursor material, such as minute graphite particles, using a low-cost process, but not via flattening of CNTs. These nano materials could potentially become cost-effective substitutes for CNTs or other types of nano-rods for various scientific and engineering applications. These diligent efforts have led to the following patent or patent applications:

7. B. Z. Jang and W. C. Huang, "Nano-scaled Graphene Plates," U.S. Pat. No. 7,071,258 (Jul. 4, 2006).
8. B. Z. Jang, L. X. Yang, S. C. Wong, and Y. J. Bai, "Process for Producing Nano-scaled Graphene Plates," U.S. patent Ser. No. 10/858,814 (Jun. 3, 2004).
9. Jiusheng Guo, A. Zhamu, and B. Z. Jang, "Nano-scaled Graphene Plate-Reinforced Composite Materials and Method of Producing Same," U.S. patent Ser. No. 11/257,508 (Oct. 26, 2005).
10. Lulu Song, Jiusheng Guo, A. Zhamu, and Bor Z. Jang, "Highly Conductive Nano-scaled Graphene Plate Nanocomposites and Products" U.S. patent Ser. No. 11/328,880 (Jan. 11, 2006).

Specifically, Jang, et al. [Ref.8] disclosed a process to readily produce NGPs in large quantities. The process includes the following procedures: (1) providing a graphite powder containing fine graphite particles preferably with at least one dimension smaller than 200 μm (most preferably smaller than 1 μm); (2) exfoliating the graphite crystallites in these particles in such a manner that at least two graphene planes are fully separated from each other, and (3) mechanical attrition (e.g., ball milling) of the exfoliated particles to become nano-scaled, resulting in the formation of NGPs with a platelet thickness smaller than 100 nm. The starting powder type and size, exfoliation conditions (e.g., intercalation chemical type and concentration, temperature cycles, and the mechanical attrition conditions (e.g., ball milling time and intensity)) can be varied to generate, by design, various NGP materials with a wide range of graphene plate thickness, width, and length values. We have successfully prepared NGPs with an average length smaller than 500 nm and, in several cases, smaller than 100 nm. Ball milling is known to be an effective process for mass-producing ultra-fine powder particles. The processing ease and the wide property ranges that can be achieved with NGP materials make them promising candidates for many important engineering applications. The electronic, thermal, and mechanical properties of NGP materials are expected to be comparable to those of carbon nano-tubes, but NGPs will be available at much lower costs and in larger quantities.

The NGP material can be used as a nano-scaled reinforcement for a matrix material to obtain a nanocomposite. Expected advantages of nano-scaled reinforcements in a matrix material include: (1) when nano-scaled fillers are finely dispersed in a polymer matrix, the tremendously high surface area could contribute to polymer chain confinement effects, possibly leading to a higher glass transition temperature, stiffness and strength; (2) nano-scaled fillers provide an extraordinarily zigzagging, tortuous diffusion path that results in enhanced barrier or resistance against permeation of moisture, oxygen, other gases, and liquid chemical agents. Such a tortuous structure also serves as an effective strain energy dissipation mechanism associated with micro-crack propagation in a brittle matrix such as ceramic, glass, or carbon; (3) nano-scaled fillers can also enhance the electrical and thermal conductivities in a polymer, ceramic or glass matrix; and (4) carbon-based nano-scaled fillers have excellent thermal protection properties, and, if incorporated in a matrix material, could potentially eliminate the need for a thermal protective layer, for instance, in rocket motor applications.

In a related subject, exfoliated graphite may be impregnated with a resin to obtain an expanded graphite flake (EGF)-resin composite. Alternatively, expandable graphite particles may be dispersed in a monomer or oligomer and then exfoliated before the monomer/oligomer is polymerized or cured, also resulting in the formation of an expanded graphite flake-resin composite. These conventional exfoliated graphite flake composites are discussed in the following references:

11. M. Xiao, L. Y. Sun, J. J. Liu, Y. Li, and K. C. Gong, "Synthesis and Properties of Polystyrene/Graphite Nanocomposite," Polymer, 43-8 (2002) 2245.
12. G. H. Chen, C. Wu, W. Weng, D. Wu, and W. Yan, "Preparation of Polystyrene/Graphite Nano-sheet Composite," Polymer, 44 (2003) 1781-1784.
13. W. Zheng, S. C. Wong, and H. J. Sue, "Transport behavior of PMMA/expanded graphite nanocomposites," Polymer, 73 (2002) 6767.
14. W. Zheng and S. C. Wong, "Electrical conductivity and dielectric properties of PMMA/expanded graphite composites," Composite Sci., and Tech., 63 (2003) 225.
15. L. T. Drzal and H. Fukushima, "Expanded Graphite and Products Produced Therefrom," U.S. patent application Ser. No. 10/659,577 (Sep. 10, 2003).
16. L. R. Bunnell, Sr., "Enhancement of the Mechanical Properties by Graphite Flake Addition," U.S. Pat. No. 4,987,175 (Jan. 22, 1991).
17. L. R. Bunnell, Sr., "Method for Producing Thin Graphite Flakes with Large Aspect Ratios," U.S. Pat. No. 5,186,919 (Feb. 16, 1993).

The application of these prior-art composites have been limited to electrical and mechanical applications, but not for supercapacitor electrode applications. For instance, thin exfoliated graphite flakes, with extremely high aspect ratio (length/thickness ratio>100~1000), lead to a lower percolation threshold (typically 1-4% by weight EGF) for forming an electron-conducting path, as compared to a threshold of typically 5-20% for other types of graphite particles. However, conventional EGF composites with a high EGF loading either cannot be formed into thin composite plate, cannot be molded with mass production techniques, or are simply not processable into useful products. Although one would expect the electrical conductivity of an EGF composite to become higher if the EGF loading is greater (e.g., >20% by weight), no melt-blended composite containing more than 20% by weight of well-dispersed, fully separated EG flakes has hitherto been reported. The approach of "intercalation and in situ polymerization" is applicable to only a limited number of polymers that have a wide window of synthesis conditions such as polystyrene and nylon-6.

After an extensive and in-depth study of the electrochemical response of both isolated and fully separated EGFs and NGPs and their composites, we have found that a certain class of meso-porous composites containing EGFs and NGPs as electrode ingredients exhibit superior charge double layer-type supercapacitance and redox charge transfer-type pseudo-capacitance. These electrode materials can be mass-produced cost-effectively and, hence, have much greater utility value compared to carbon nanotube-based materials.

Thus, it is an object of the present invention to provide a porous nanocomposite that contains fully separated graphite platelets with a sufficient amount and packing arrangement effective for achieving a high surface area greater than 100 $m^2/gm$ (typically greater than 200 $m^2/gm$, some greater than 500 $m^2/gm$, and even greater than 1000 $m^2/gm$ when the nanocomposite matrix is made through pyrolization of a polymer).

It is another object of the present invention to provide a porous nanocomposite that contains fully separated graphite platelets with a sufficient level of porosity effective for achieving a high capacitance value when used as a supercapacitor electrode.

It is yet another object of the present invention to provide a porous nanocomposite electrode comprising fully separated graphite platelets that are smaller than 10 μm in length, width or diameter (typically and preferably smaller than 0.5 μm or 500 nm) and smaller than 100 nm in thickness (typically and preferably smaller than 10 nm).

It is still another object of the present invention to provide a porous nanocomposite comprising fully separated graphite platelets that are surface-functionalized or activated.

It is still another object of the present invention to provide a porous nanocomposite electrode comprising fully separated graphite platelets that are smaller than 10 μm in length, width or diameter (preferably smaller than 0.5 μm or 500 nm) and smaller than 100 nm (preferably smaller than 10 nm) in thickness. These nano-scaled graphene plates are attached to or bonded by a conductive material such as a conjugate chain polymer for a significantly improved charge storage capacity. The matrix material may comprise a conducting polymer, polymeric carbon, coal tar pitch, petroleum pitch, glassy or amorphous carbon, or a combination thereof

SUMMARY OF THE INVENTION

Preferred embodiments of the present invention include a meso-porous nanocomposite material, an electrode comprising such a nanocomposite material, and a supercapacitor comprising such an electrode. The nanocomposite comprises: (A) nano-scaled graphene platelets (NGPs) or expanded graphite flakes (EGFs), wherein each of the platelets or flakes comprises a sheet of graphite plane or multiple sheets of graphite plane, and the platelets or flakes have a thickness no greater than 100 nm (preferably smaller than 10 nm) and an average length, width, or diameter no greater than 10 μm (preferably smaller than 500 nm); and (B) a binder or matrix material attached or bonded to the platelets or flakes to form the nanocomposite material having liquid accessible pores characterized in that the nanocomposite material has a surface area greater than about 100 $m^2/gm$ (preferably greater than 500 $m^2/gm$).

The presence of a binder or matrix in an electrode may not be a necessary condition, but it is highly desirable. The binder material not only helps to hold the NGPs together in an electrode, but also can impart additional surface areas and/or pseudo-capacitance to the supercapacitor. The binder or matrix material preferably is electrically conducting. The conductive binder or matrix material may be selected from the group consisting of a conducting polymer, a polymeric carbon, an amorphous carbon, a petroleum pitch or its derivative, a coal tar pitch or its derivative, and combinations thereof. The conducting material preferably comprises a conjugate chain polymer such as polypyrrole, polyaniline, and polythiophene. The NGPs alone, or NGP-matrix/binder composite materials, may be subjected to surface treatments such as $CO_2$ activation, transition metal oxide or sulfide coating, and/or conjugate chain polymer coating to obtain pseudo-capacitance effects. A polymer, coal tar pitch, or petroleum pitch matrix can be further pyrolyzed or carbonized to increase specific surface area and electrical conductivity of the nanocomposite.

BRIEF DESCRIPTION OF THE DRAWINGS

FIG. 6. Specific capacitance of NGP mat- and Polypyrrole (PPy)-coated NGP mat-based supercapacitors.

FIG. 7. Specific capacitance of NGP-base, PAN-derived meso-porous nanocomposite-based systems.

FIG. 8. Specific surface area of NGP mat and NGP/PAN-based carbon matrix nanocomposites.

DESCRIPTION OF THE PREFERRED EMBODIMENTS

Figure 1:
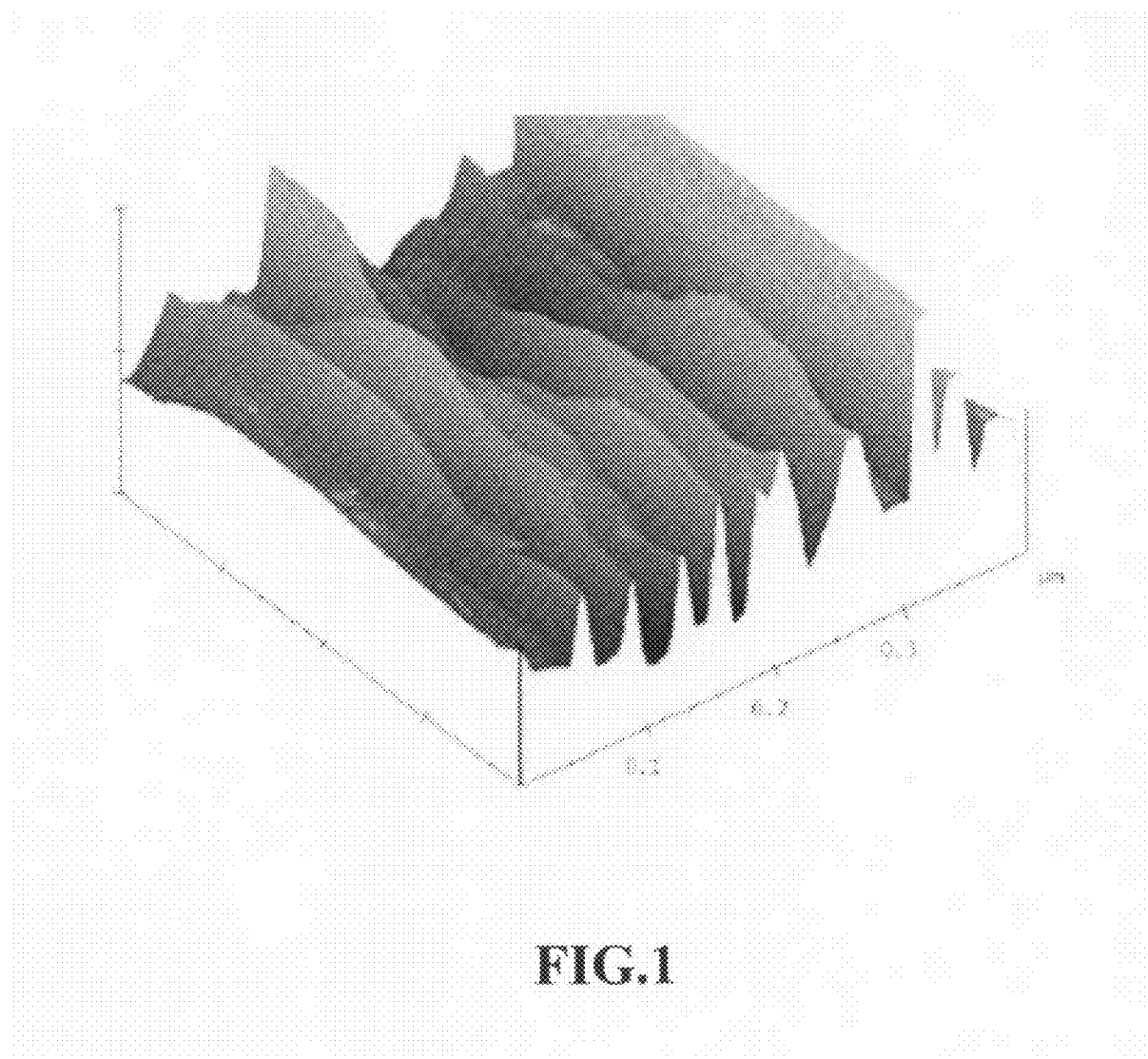
FIG. 1 An atomic force microscopic image of selected NGPs.

The present invention may be understood more readily by reference to the following detailed description of the invention taken in connection with the accompanying drawing figures, which form a part of this disclosure. It is to be understood that this invention is not limited to the specific devices, methods, conditions, or parameters described and/or shown herein, and that the terminology used herein is for the purpose of describing particular embodiments by way of example only and is not intended to be limiting of the claimed invention.

For the purpose of defining the geometry and orientation of an NGP, the NGP is described as having a length (the largest dimension), a width (the second largest dimension), and a thickness. The thickness is the smallest dimension, which is no greater than 100 nm. When the platelet is approximately circular in shape, the length and width are referred to as diameter. In the presently defined NGPs, both the length and width are smaller than 1 μm and more preferably and typically smaller than 0.5 μm (500 nm). We have been able to produce NGPs with length smaller than 100 nm. In the present context, expanded graphite flakes (EGF) are those thin flakes or platelets that have a thickness smaller than 100 nm, but with length and width being greater than 1 μm, more typically greater than 10 μm, and most typically between 10 μm and 200 μm.

A preferred embodiment of the present invention is a meso-porous nanocomposite material comprising fully separated NGPs and/or EGFs that are dispersed in, bonded by, or coated with a matrix or binder material, wherein the platelets have a thickness no greater than 100 nm (preferably smaller than 10 nm and most preferably smaller than 2 nm). Preferably, the platelets or flakes have an average length, width, or diameter no greater than 10 μm, preferably smaller than 500 nm, and most preferably smaller than 100 nm. When the platelets have an average length, width, or diameter no greater than 500 nm and average thickness no greater than 10 nm, the resulting nanocomposite tends to have a surface area greater than 300 $m^2/gm$. When the average NGP thickness is 2 nm or smaller, the resulting nanocomposite typically has a surface area greater than 500 $m^2/gm$. With a further treatment of the binder or matrix material, such as activation or carbonization, the total surface area could easily exceed 1000 $m^2/gm$. These nano-scaled graphene plates are present in an amount no less than 15% by weight (preferably greater than 50%) based on the total weight of the NGPs and a matrix, binder, or a coating material combined. This amount is preferably selected to be sufficiently high to make the nanocomposite electrically conductive with a bulk conductivity no less than 1 S/cm (when no pore exists). The amount of pores are such that the total surface area of the resulting nanocomposite is no smaller than 100 $m^2/gm$, preferably no smaller than 200 $m^2/gm$, more preferably greater than 500 $m^2/gm$, and most preferably greater than 1000 $m^2/gm$ when the composite is used as a supercapacitor material.

Figure 2:
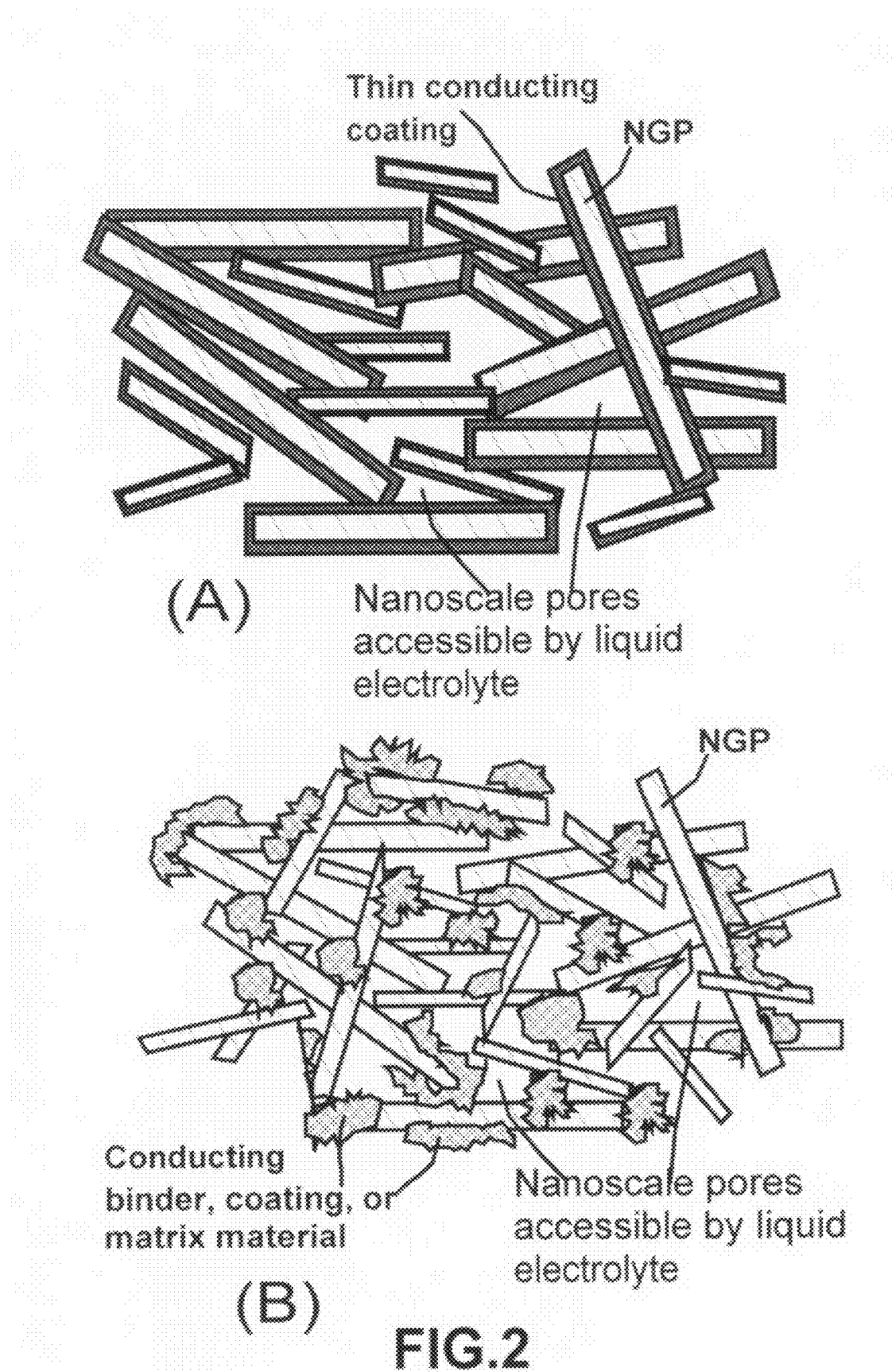
FIG. 2 Schematic of two basic forms of meso-porous NGP nanocomposites: (A) comprising NGPs coated with a thin layer of conducting polymer or surface functional groups; and (B) comprising NGPs bonded by a conductive binder, coating, or matrix material that can be a conducting polymer or carbon (e.g., polymeric carbon).

Schematically shown in FIG. 2(A) is one form of the invented meso-porous nanocomposite structure wherein NGPs are coated with an ultra-thin layer of conducting polymer, carbon, and/or surface functional groups that could promote pseudo-capacitance. The coating more or less covers the entire exposed surface of a NGP. The NGPs are arranged in such a manner that there is a large number of minute pores that are preferably greater than 2 nm but smaller than 1 μm in size, further preferably between 2 nm and 100 nm, and most preferably between 2 nm and 10 nm. If the pore size is smaller than 2 nm, the double-layer capacitance zone cannot be completely formed. If the pore sizes are too large, the surface area will be too small. The pores are preferably also interconnected to make them accessible by the liquid electrolyte when used in a supercapacitor electrode.

Another form of the invented meso-porous nanocomposite is schematically shown in FIG. 2(B), wherein NGP platelets are bonded by, coated with, or dispersed in a conducting material, which is preferably a conjugate-chain conducting polymer, a carbonaceous material, an amorphous or glassy carbon, or a combination thereof. Although not a preferred choice, a non-conducting polymer such as Teflon (polytetrafluoroethylene) or poly(vinylidene fluoride) can be used as a binder to help consolidate the NGPs. Again, it is most preferred that the pores are sized between 2 nm and 10 nm. A conducting polymer provides an opportunity for added pseudo-capacitance due to the redox effect intrinsic to the conducting polymer or between the conducting polymer and the NGP. A carbon matrix can be derived from a precursor polymer, coal tar pitch, or petroleum pitch through pyrolyzation (heat-induced carbonization), which produces additional pores and surface areas.

Figure 3:
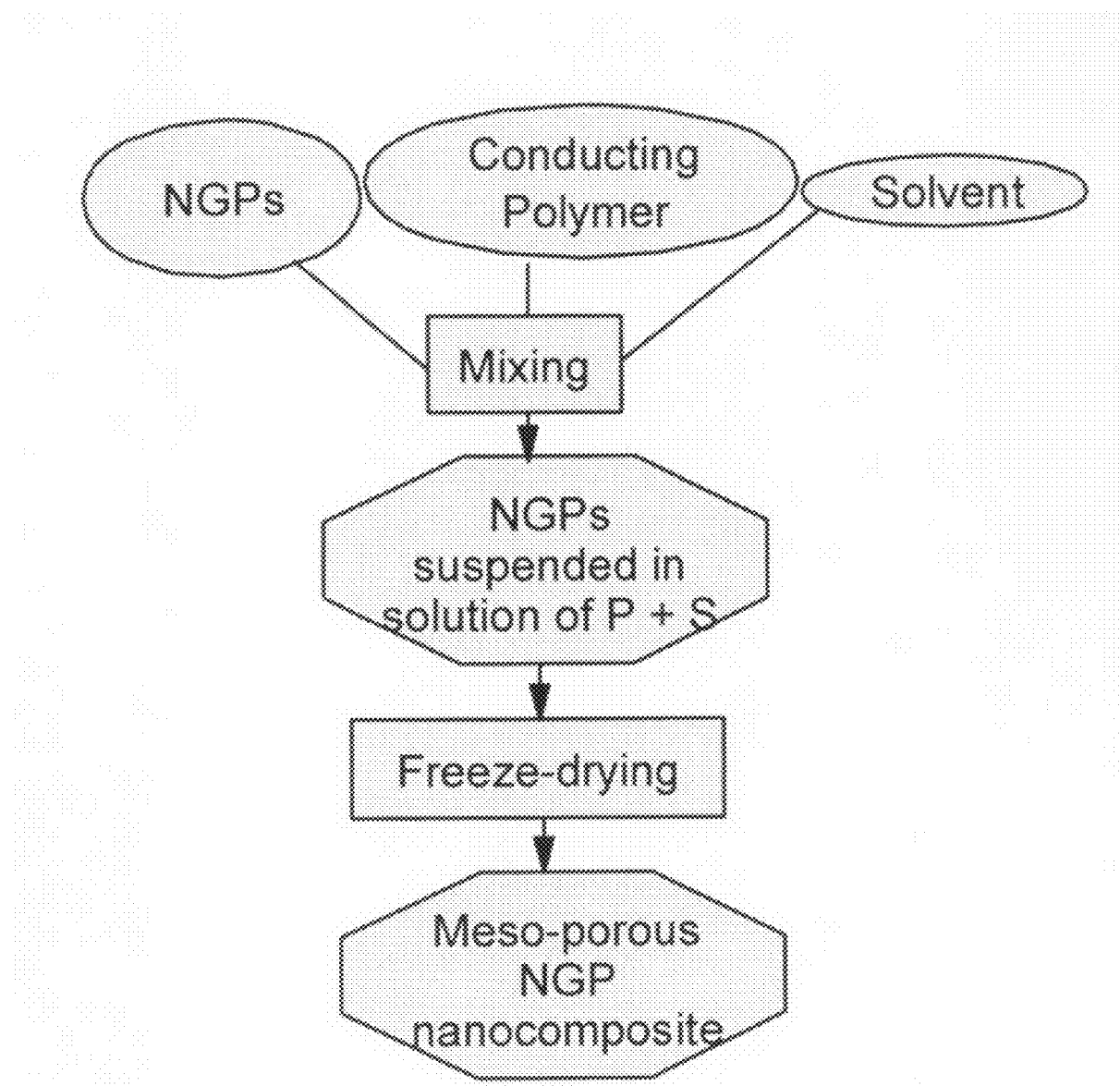
FIG. 3 One way to produce meso-porous nanocomposites.

The preparation and characteristics of meso-porous NGP nanocomposites are further described in what follows (as examples): In Route 1, as shown in FIG. 3, a meso-porous nanocomposite can be obtained by freeze-drying, which entails first dispersing NGPs in a polymer-solvent solution to form a NGP suspension. This suspension is then formed into a desired shape with the solution being rapidly frozen (e.g., using liquid nitrogen as a cooling medium). The frozen "solid" is subjected to a vacuum- or pumping-assisted procedure to facilitate sublimation of the solvent, leaving behind NGPs, the solid polymer, and a large amount of pores. If the polymer is a conducting polymer, no further chemical treatment is needed (except for conversion of a precursor polymer to a conductive polymer), and the resulting material is a good meso-porous nanocomposite that can be shaped into a supercapacitor electrode. Conducting (conjugate-chain) polymers, such as polyaniline, and their soluble precursor polymers are good choices for use in the present invention. Alternatively, a non-conducting material can be converted to become a polymeric carbon by pyrolization, which involves heating to disintegrate the polymer and removing most of the non-carbon elements from the material. The non-carbon elements, forming molecules like carbon dioxide, escape from the polymer, creating minute pores.

Figure 4:
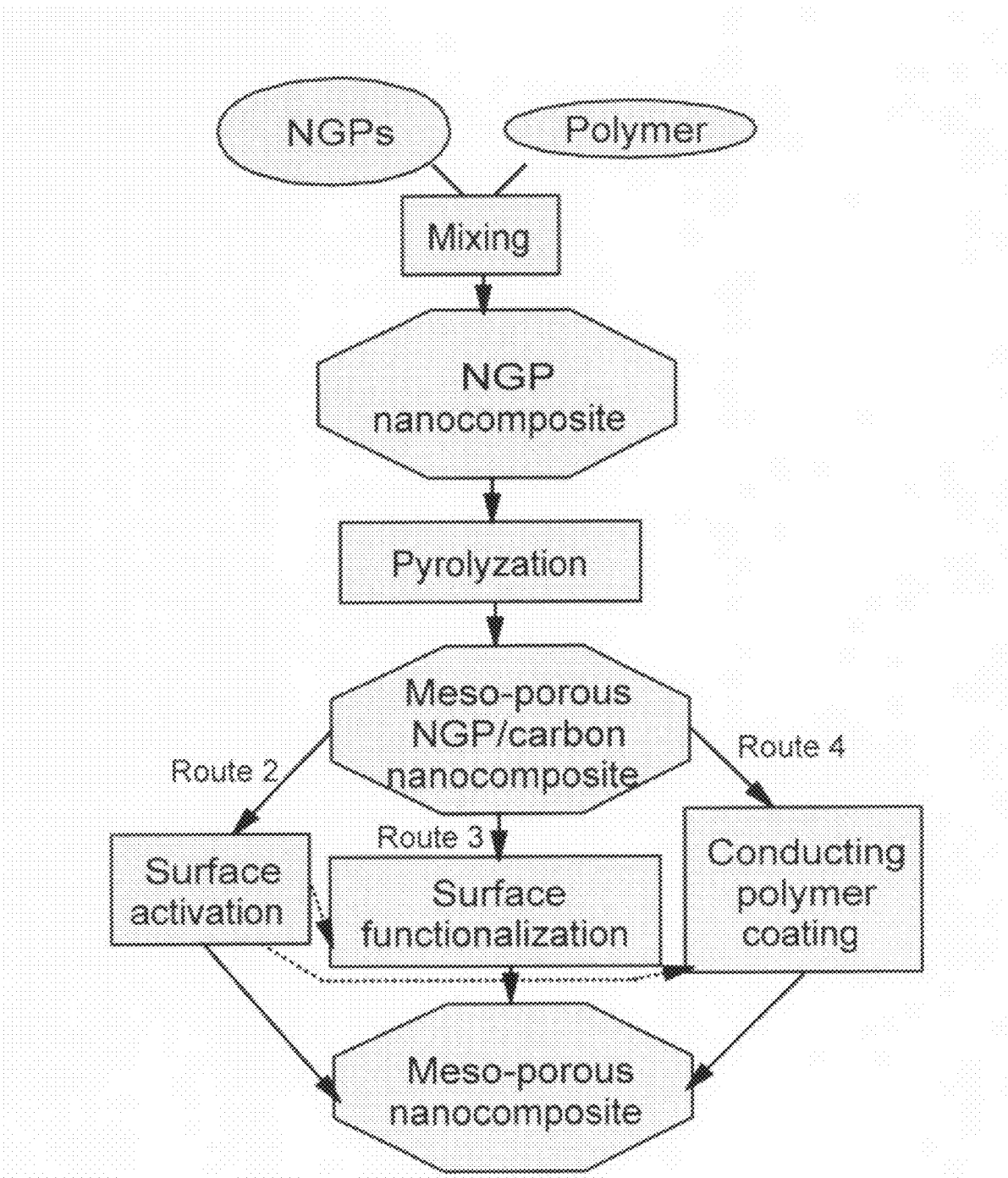
FIG. 4 Additional three routes to the fabrication of meso-porous nanocomposites.

Alternatively, in Routes 2-4 as shown in FIG. 4, a polymer and NGPs can be mixed through solution mixing or melt blending to form a NGP nanocomposite. The polymer is preferably one that has a high carbon yield such as phenolic resin and polyacrylonitrile (PAN). The polymer nanocomposite is then pyrolyzed to become carbon nanocomposite. The removal of non-carbon elements from the polymer generates a large number of pores that are by and large interconnected to allow for accessability of liquid electrolyte. This pyrolization procedure could significantly increase the surface area from typically 100-200 $m^2/gm$ to above 300 $m^2/gm$ (typically 500-1,000 $m^2/gm$), a highly desirable result. The meso-porous carbon nanocomposite may be subjected to an activation treatment (analogous to activation of carbon black materials) to create additional surfaces and possibly imparting functional chemical groups to these surfaces. The activation treatment can be accomplished through $CO_2$ physical activation, KOH chemical activation, or exposure to nitric acid, fluorine, or ammonia plasma.

Further alternatively, the meso-porous carbon nanocomposite (with or without an activation treatment) may be surface functionalized or coated with a conducting polymer in Route 3 and Route 4, respectively. Conducting polymers, such as polyacetylene, polypyrrole, polyaniline, polythiophene, and their derivatives, are good choices for use in the present invention. These treatments are intended for further increasing the capacitance value through pseudo-capacitance effects such as redox reactions. Alternatively, transition metal oxides or sulfides such as $RuO_2$, $TiO_2$, $MnO_2$, $Cr_2O_3$, and $CO_2O_3$ can be deposited onto the NGP surface for pseudo-capacitance. Other useful surface functional groups may include quinone, hydroquinone, quaternized aromatic amines, mercaptans, or disulfides. This latter class of functional groups also has been shown to impart pseudo-capacitance to CNT-based supercapacitors.

In another preferred embodiment, polymer-coated NGPs can be prepared by dispersing NGPs in a dilute polymer-solvent solution. By stir-mixing these platelets in the solution, separating these platelets from the solution via filtering, and then removing the solvent (in a vacuum oven or chemical fume hood), one obtains NGP platelets that are each surface-coated with a thin layer of polymer. A structure containing polymer-coated NGPs can then go through the procedures described in FIG. 4 (Routes 2-4) to produce meso-porous nanocomposites.

In another preferred embodiment of the present invention, a porous composite can be made to an appropriate shape by a conventional slurry molding technique using NGPs, possibly along with a small amount of carbon nano-fibers (CNFs), carbon nanotubes (CNTs) or other nano-scaled fillers, if so desired. An aqueous slurry is prepared which comprises a mixture of NGPs with an intended matrix polymer, and possibly along with other conductive ingredients such as carbon fibers, metal fibers, CNTs, CNFs, EGFs, carbon blacks, metal particles, or a combination thereof. The matrix polymer is typically a thermoplastic in a powder, granule, or, preferably, fibrous or filamentous form. The slurry, consisting of NGPs, other optional fillers, polymer particles/fiber segments, and water, is forced through a sieve or mold screen of a desired mesh size to trap the solids (allowing water to go through), thus producing a wet monolithic, which is subsequently dried at a temperature of less than 80° C. This mold screen may be a part of a mold. The initial porosity of the preform in the slurry molded and dried condition is typically in the range 30-70%. If necessary, the dried monolith preform is further densified via compression. The resulting solid mixture may be transferred to a hot pressing mold cavity for compression molding into a useful shape, such as a supercapacitor electrode. During the molding procedure, the thermoplastic fibers or powders get melted and the resulting polymer fluid flows around the reinforcement elements (i.e., NGPs and EGFs.) to become the binder or matrix of a composite, which is then pyrolized to become a meso-porous nanocomposite.

In another preferred embodiment, the porous structure can be made by using a platelet/resin spraying technique. The directed platelet spray-up process utilizes an air-assisted gun which conveys reinforcement elements (NGPs) and a resin to a molding tool (e.g., a perforated metal screen shaped identical or similar to the part to be molded). In addition to NGPs, other conductive ingredients such as metal fibers, carbon nano-tubes, graphitic nano-fibers, carbon fibers, carbon blacks, or a combination thereof can be a part of the air-driven stream of preform ingredients that impinges upon the metal screen. This shaped screen can be a part of a mold. The NGPs may be held in place on the screen by a large blower drawing air through the screen. Once the desired thickness of reinforcement has been achieved, the spraying system is turned off and the preform is ready for subsequent molding operations, which could entail polymerizing or curing the resin (if thermosetting) or heating and cooling the resin (if thermoplastic). The composite structure may be subsequently pyrolyzed to obtain a meso-porous nanocomposite.

Figure 5:
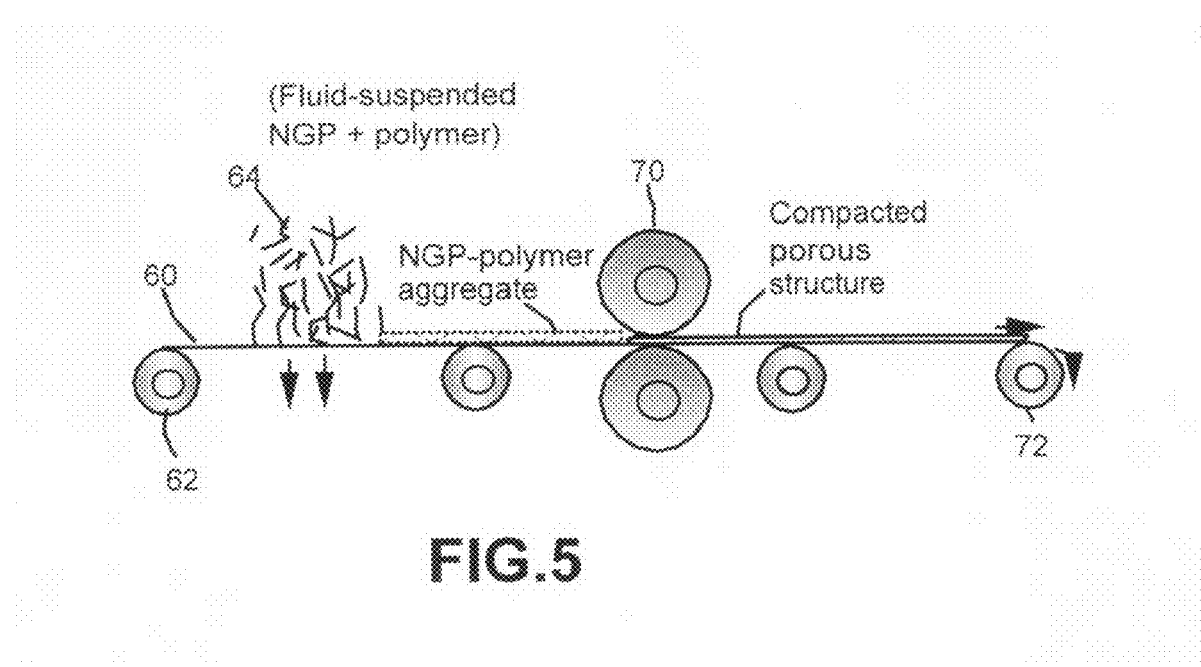
FIG. 5 Schematic of a slurry molding- or directed platelet/resin spray-based process for producing an intimate blend of NGPs and a polymer to form meso-porous nanocomposite electrode.

Both the slurry molding and directed spraying routes can be implemented as a continuous process. For instance, as shown in FIG. 5, the process begins with pulling a web 60 (porous sheet) from a roller 62. The moving web receives a stream of slurry 64 (as described in the above-described slurry molding route) from above the web. Water sieves through the web with all other ingredients (a mixture of NGPs and thermoset powders or thermoplastic fibers, etc.) remaining on the surface of the web. These solid ingredients are moved forward to go through a compaction stage by a pair of compaction rollers 70. Heat may be supplied to the mixture before, during, and/or after compaction to begin to cure the thermoset resin or begin to melt the thermoplastic. The mixture or preform can be taken up on a winding drum 72 for later use (e.g., shaping and pyrolyzation treatments). For instance, NGP/phenolic resin can be subjected to pyrolyzation treatments to convert phenolic resin to a carbon matrix, resulting in a meso-porous NGP carbon/carbon nanocomposite. Carbonization of a polymer, either thermoplastic or thermoset, can be conducted in an inert atmosphere at a temperature in the range of 300-500° C. first, which is then followed by a higher temperature treatment at 500-2500° C. The resulting structure is highly porous.

Similar procedures may be followed for the case where the mixture of NGPs and polymer powders or fibers is delivered to the surface of a moving web 60 by compressed air, as in a directed platelet/resin spraying route described above. Air will permeate through the web with other solid ingredients trapped on the surface of the web, which are conveyed forward. The subsequent operations are similar to those involved in the continuous slurry molding route.

Both the slurry molding and directed spraying techniques can be used to form a mat or web of NGPs or EGFs, which may be optionally bonded by a binder. The resulting mat can be used as an electrode (typically an anode) onto which a conducting polymer is electro-polymerized.

As indicated earlier, additional fillers (preferably nano-scaled) may be added to the NGP composites to modify other properties such as friction, wear, strength, stiffness, and toughness. These nano-scaled fillers may be selected from the group consisting of carbon nanotubes, carbon nano fibers, carbon blacks, nano-powders, and combinations thereof.

The following examples serve to illustrate the preferred embodiments of the present invention and should not be construed as limiting the scope of the invention:

EXAMPLE 1

Poly(3-methyl-thiophene)-Coated NGPs

Electronically conductive polymers by themselves are promising supercapacitor electrode materials because the charge process involves the entire polymer mass, and they provide low equivalent series resistance for the electrode. When combined with an NGP-type substrate material, the conducting polymer can impart pseudo-capacitance to the electrode. One desirable conductive polymer selected was poly(3-methyl-thiophene) (pMeT), particularly its p-doped variant. Poly(3-methyl-thiophene) could be synthesized by an oxidative chemical polymerization technique using ferric chloride as a dopant in an inert atmosphere. However, we chose to prepare PMeT doped with different anions electro-chemically in the presence of tetra-alkyl-ammonium salts using an NGP mat as an electrode. The specific capacitance of an NGP mat (average NGP thickness=5.2 nm, length=490 nm, and width=490 nm) with no further treatment was found to be 38 F/g, which was increased to 93 F/g with a thin coating of pMeT. (It may be noted that these specific capacitance values were obtained from non-optimized samples.) This was achieved with low-cost NGPs, as opposed to expensive CNT-based materials. A multi-wall CNT/poly(3,4-ethylenedioxythiophene) composite, prepared by chemical or electro-chemical polymerization, when evaluated in 1 M $H_2SO_4$, 6 M KOH, or 1 M tetraethylammonium tetrafluoroborate (TEABF4) in acetonitrile, exhibited capacitance values of 60 to 160 F/g. However, CNT materials are much more expensive.

EXAMPLE 2

Polypyrrole-Coated NGPs

Polypyrrole (PPy) can be prepared by electrochemical polymerization with well-controlled growth rates and film thickness. When a monomer solution was electrolyzed in the presence of $Et_4N^+BF_4^-$, a blue-black conducting polymer was produced at the anode. This electrode was made of a NGP-based mat using a slurry molding process shown in FIG. 5 without a binder polymer. The produced PPy was in the doped state. Several NGP groups with thicknesses ranging from approximately 1.9 nm to approximately 82 nm were prepared for the present study. As indicated in FIG. 6, the specific capacitance of the NGP mat electrode without any further surface treatment was in the range from 5.2 F/g (for the mat with average NGP thickness of about 82 nm) to 82 F/g (for NGP thickness of approximately 1.9 nm). With a PPy coating, the corresponding values were in the range of 41 F/g-143 F/g, indicating a significant pseudo-capacitance effect.

EXAMPLE 3

NGP-Carbon Black with a Teflon Binder

Carbon black (Black Pearls 2000 from Cabot) and NGPs (at a ratio of 5:5, 8:2, and 10:0 (pure carbon black)) were mixed and dispersed in deionized water. A Teflon particle suspension was poured into the carbon black-NGP-deionized water slurry and thoroughly stirred. The resulting sludge was dried to a dough and rolled into a Nickel net to form an electrode of 0.2 mm thickness, which was sintered at 320° C. under a pressure of 4 kg/cm². The electrolyte used was 1 M tetra-ethyl-ammonium tetrafluoroborate ($TEABF_4$) in acetonitrile. The specific capacitance of these three samples falls into the range of 70-80 F/g. However, the sample with the CB/NGP ratio of 5:5 exhibits an electrical conductivity greater than 100 S/cm, while the pure CB sample (10:0 ratio) has a conductivity lower than 0.1 S/cm. This implies that the NGP can dramatically reduce the equivalent series resistance of a carbon black or activated carbon-based supercapacitor electrode material. This is an important feature for a good electrode material since a lower resistance could lead to a lower energy loss and faster capacitor response. The maximum power density of a supercapacitor is given by $P_{max}=V_i^2/(4R)$, where $V_i$ is the initial voltage and R the equivalent series resistance (ESR). A lower ESR means a higher power density. Due to their high length-to-thickness and width-to-thickness ratios, NGPs could easily overlap each other to form a continuous electron path for enhanced conductivity. Other fillers that can be incorporated in the nanocomposite includes graphitic nano-fiber, carbon nanotube, carbon fiber, nano-scaled metal, nano-scaled metal oxide, and combinations thereof.

EXAMPLE 4

NGP-Carbon Matrix Composite Film and NGP-Based Bucky Paper

The performance of supercapacitor electrodes based on NGP-carbon nanocomposite film derived from polyacrylonitrile (PAN) matrix was investigated. A NGP/PAN dispersion was prepared at room temperature by mixing NGPs with a 1.5 g/l dimethylformamide (DMF) solution of poly(acrylonitrile-methyl acrylate) (90:10) (PAN copolymer with Mw=approximately 100,000 g/mol from Aldrich). The weight ratio of NGP to PAN copolymer was 4:6. Solvent casting of the suspension at 85-100° C. resulted in a thin film of 5-6 μm thickness. The film was essentially a Buckypaper. Samples of the film were heat treated at 700° C. in an argon atmosphere for 30 minutes to obtain NGP-carbon matrix nanocomposites (Sample Group 4-A). Several of these samples were subsequently activated in $CO_2$ at 700° C. for 20 minutes in a tube furnace to obtain Sample Group 4-B. Some of Group 4-A material was electro-chemically deposited with a thin layer of PPy to obtain Sample Group 4-C. The data shown in FIG. 7 demonstrate that both surface activation and conductive polymer coating are very effective in further enhancing the specific capacitance of NGP Buckypaper or web. Impressive supercapacitance values (e.g., >200 F/g) are readily achievable with the presently invented meso-porous nanocomposites.

FIG. 8 shows that the specific surface area of an NGP mat or web can be significantly increased by adding a polymer binder or matrix polymer and then carbonizing this polymer (e.g., an increase from 501 m²/g to 1130 m²/g in one sample and from 189 m²/g to 890 m²/g in another sample). The polymer can be any polymer with a high carbon content such as phenolic-formaldehyde, polyacrylonitrile, and cellulosic polymers.

EXAMPLE 5

Transition Metal Oxide-Coated NGP Mat

A number of transition metal halides bearing a 2,6-bis (imino)piridyl ligand, $LMCl_2$, where L=2,6-$(ArNCCH_3)_2C_5H_3N$ and M=transition metal atom), have been synthesized (prior art). The manganese halide complex (M=Mn) was electrochemically deposited onto the surface of an NGP mat electrode in a water-containing acetonitrile electrolyte (containing 0.1 M of tetra-butyl-ammonium perchlorate) to form a thin manganese oxide layer. The specific capacitance of the NGP mat (NGP thickness=5.2 nm) was increased from 38 F/g to 79 F/g. Other transition metal oxides or sulfides can also be used as a source of pseudocapacitance.

In conclusion, we have successfully developed a new and novel class of meso-porous nanocomposites that are superior supercapacitor electrode materials. A supercapacitor can make use of this material in one or both of the electrodes. These NGP-based nanocomposites exhibit great capacitance and electrical conductivity. Other desirable features of NGPs include chemical stability and low mass density. They are also of lower costs compared with carbon nano-tube-based materials. Both NGPs and NGP-based nanocomposites can be mass produced cost-effectively.

We claim:
1. A meso-porous nanocomposite material comprising:
   (A) nano-scaled graphene platelets or expanded graphite flakes, wherein each of the platelets or flakes comprises a sheet of graphite plane or multiple sheets of graphite plane and the platelets or flakes have a thickness no greater than 100 nm; and
   (B) a binder or matrix material attached or bonded to said platelets or flakes to form said nanocomposite material having liquid accessible pores characterized in that said nanocomposite material has a surface area greater than about 100 m²/gm.

2. The nanocomposite material as defined in claim 1 wherein said platelets have an average length, width, or diameter no greater than 500 nm or said nanocomposite material has a surface area greater than about 200 $m^2/gm$.

3. The nanocomposite material as defined in claim 1 wherein said binder or matrix material comprises a conductive material selected from the group consisting of a conducting polymer, a polymeric carbon, an amorphous carbon, a petroleum pitch or its derivative, a coal tar pitch or its derivative, and combinations thereof.

4. The nanocomposite material as defined in claim 1 wherein said platelets or flakes are activated or surface-functionalized.

5. The nanocomposite material as defined in claim 1 wherein said platelets have an average length, width, or diameter no greater than 500 nm and average thickness no greater than 10 nm, or said nanocomposite has a surface area greater than 300 $m^2/gm$.

6. The nanocomposite material as defined in claim 1 wherein said surface area is greater than 500 $m^2/gm$.

7. The nanocomposite material as defined in claim 1 wherein said platelets or flakes are functionalized with one or more transition metal oxides or sulfides.

8. The nanocomposite material as defined in claim 1 wherein said platelets or flakes have an average thickness smaller than 10 nm.

9. The nanocomposite material as defined in claim 1 wherein said binder or matrix material comprises a polymeric carbon derived from phenolic-formaldehyde, polyacrylonitrile, or cellulosic polymer.

10. The nanocomposite material as defined in claim 1, further comprising a conductive filler selected from the group consisting of graphitic nano-fiber, carbon nanotube, carbon black, carbon fiber, nano-scaled metal, nano-scaled metal oxide, and combinations thereof.

11. A capacitor having an electrode comprising nano-scaled graphene platelets or expanded graphite flakes with an average platelet or flake thickness no greater than 100 nm and a plurality of pores accessible by a liquid electrolyte wherein said electrode has a surface area greater than about 100 $m^2/gm$.

12. The capacitor as defined in claim 11 wherein said platelets have an average length, width, or diameter no greater than 500 nm, or have an average thickness no greater than 10 nm.

13. The capacitor as defined in claim 11 wherein said platelets or flakes are bonded by or attached to a conductive matrix material selected from the group consisting of a conducting polymer, a polymeric carbon, an amorphous carbon, a petroleum pitch, a coal tar pitch, and combinations thereof.

14. The capacitor as defined in claim 11 wherein said platelets or flakes are bonded by a non-conducting material.

15. The capacitor as defined in claim 11 wherein said surface area is greater than 200 $m^2/gm$.

16. The capacitor as defined in claim 11 wherein said surface area is greater than 500 $m^2/gm$.

17. The capacitor as defined in claim 11 wherein said platelets or flakes are surface-functionalized or activated.

18. The capacitor as defined in claim 11 wherein said platelets or flakes are bonded by or dispersed in a conductive material comprising a polymeric carbon derived from phenolic-formaldehyde, polyacrylonitrile, or cellulosic polymer.

19. A supercapacitor, comprising:
(A) a first electrode, comprising nano-scaled graphene platelets and a plurality of pores accessible by a liquid electrolyte wherein said first electrode has a surface area greater than about 100 $m^2/gm$;
(B) a second electrode, comprising nano-scaled graphene platelets and a plurality of pores accessible by said liquid electrolyte wherein said second electrode has a surface area greater than about 100 $m^2/gm$; and
(C) an electrode separator disposed between the first and second electrodes, said separator comprising said liquid electrolyte which is electrically non-conductive and ionically conductive.

20. The supercapacitor as defined in claim 19 wherein said platelets have an average length, width, or diameter no greater than 500 nm, or have an average platelet thickness no greater than 20 nm.

21. The supercapacitor as defined in claim 19 wherein said platelets are bonded by or attached to a conductive matrix material selected from the group consisting of a conducting polymer, a polymeric carbon, an amorphous carbon, a petroleum pitch, a coal tar pitch, and combinations thereof.

22. The supercapacitor as defined in claim 19 wherein said platelets are activated, surface-functionalized, or surface-coated with functional materials or chemical groups for enhanced capacitance.

23. The supercapacitor as defined in claim 19 wherein said surface area is greater than 200 $m^2/gm$.

24. The supercapacitor as defined in claim 19 wherein said platelets are functionalized with one or more transition metal oxides or sulfides.

* * * * *